Sept. 9, 1952 P. COHEN 2,609,553
MACHINE CYCLE CONTROL SYSTEM
Filed Jan. 11, 1949 8 Sheets-Sheet 1

Inventor
Paul Cohen
By his Attorney

Sept. 9, 1952 P. COHEN 2,609,553
MACHINE CYCLE CONTROL SYSTEM
Filed Jan. 11, 1949 8 Sheets-Sheet 4

Fig.5.

Inventor
Paul Cohen
By his Attorney

Sept. 9, 1952 P. COHEN 2,609,553
MACHINE CYCLE CONTROL SYSTEM
Filed Jan. 11, 1949 8 Sheets-Sheet 5

Inventor
Paul Cohen
By his Attorney

Sept. 9, 1952 P. COHEN 2,609,553
MACHINE CYCLE CONTROL SYSTEM
Filed Jan. 11, 1949 8 Sheets-Sheet 6

Inventor
Paul Cohen
By his Attorney

Sept. 9, 1952 P. COHEN 2,609,553
MACHINE CYCLE CONTROL SYSTEM
Filed Jan. 11, 1949 8 Sheets-Sheet 7

Inventor
Paul Cohen
By his Attorney

Sept. 9, 1952 P. COHEN 2,609,553
MACHINE CYCLE CONTROL SYSTEM
Filed Jan. 11, 1949 8 Sheets-Sheet 8

Fig.14.

Inventor
Paul Cohen
By his Attorney

Patented Sept. 9, 1952

2,609,553

UNITED STATES PATENT OFFICE 2,609,553

MACHINE CYCLE CONTROL SYSTEM

Paul Cohen, Glen Cove, N. Y., assignor to United Shoe Machinery Corporation, Flemington, N. J., a corporation of New Jersey Application January 11, 1949, Serial No. 70,183

10 Claims. (Cl. 12—34.5)

This invention relates to arrangements for controlling the operation of a machine and more particularly to systems for controlling the machine cycle.

Attempts to provide means for automatically controlling the cycle of operation for a complicated machine have always resulted in considerable complexity. When such machines are used for operation upon boots and shoes the problem is accentuated by the necessity of arranging the machine for operation upon different sizes of shoes and for adapting the machine for use on different styles of shoes. The employment of cams for such machines becomes particularly costly when it is necessary to provide a series of interchangeable cams for different sizes and for different styles. Adjustable cams are always complicated structures and are not commercially satisfactory.

Utilization has been made of the properties of photoelectric cells for the development of control systems because of the ease with which the current output of the cell may be controlled by the amount of light which falls upon it and in some of these shutters have been employed which are interposed between the source of light and the photoelectric cell to control the cell as the shutter is moved. Some suggestions have been made for the utilization of a replaceable strip of film or the like bearing partly transparent, partly opaque traces, the shape of which determines the output of the photoelectric cell and this in turn may be utilized to operate a control mechanism. Such devices enable the use of interchangeable strips as changes are made in the prescribed cycle of operation of the machine, as for example, because of changes in styles of shoes to be treated. Some such arrangements are faulty in operation because of the inertia of the parts or the speed of the cycle through which the changes are to be made.

Accordingly, it is an object of the invention to provide an improved machine-cycle control system wherein the benefits of such electrical control systems may be realized and in addition an accurate response of the machine parts to the control devices may be obtained.

In the illustrated arrangement, a control signal derived from a photoelectric cell is determined by a composite, or algebraic sum, of the effects of coacting control strips or cams, one of which is shaped in accordance with the desired cycle of operations and the other of which moves in accordance with the actual position of the controlled part. As illustrated, superposed, partly transparent cam strips are employed to control the output of a photoelectric cell. One of these cam strips, which bears an image representing the desired cycle of operations, is moved at a constant speed while the other or follower cam is moved back and forth in accordance with the actual position of the part to be controlled.

A feature of the invention resides in the utilization of anticipating photocells which are placed ahead of the principal control cells and which receive the signal from the control cams a little sooner than the chief control cell. The output of these anticipating cells is combined with that of the principal control cell thus enabling the mechanism to follow the desired cycle more perfectly when sudden changes of position are required.

These and other features of the invention involved in the application of such a control system to a shoe leveling machine will best be understood from a consideration of the following specification, taken in connection with the accompanying drawings, in which.

The invention is illustrated herein as embodied in a shoe-bottom leveling machine having a main frame 10 (Fig. 1) in which is pivoted a shoe support or jack 12 to which swinging movements are imparted by mechanism to be hereinafter described to carry a shoe rearwardly and forwardly beneath a leveling roll 14 which is yieldingly forced down on the shoe bottom to apply leveling pressure progressively to the sole. Tipping movements may be imparted to this roll by separate power-operated means controlled automatically in a manner hereinafter described to cause the leveling pressure to be applied to selected portions of the sole.

Figure 1:
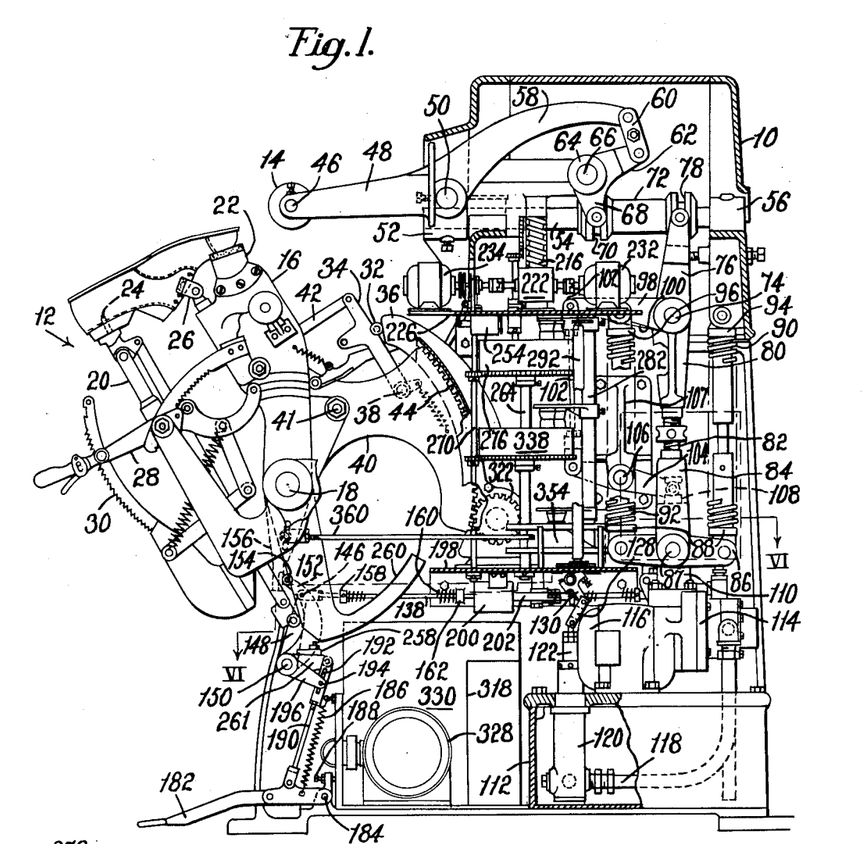
Fig. 1 shows the invention embodied in one form of shoe-leveling machine, it being taken in vertical section through the frame and its covers, to show the working parts in side elevation.

The jack 12 comprises a toe post 16 fast on a transversely extending rockshaft 18 mounted in suitable bearings in the frame 10 and a heel post 20 loosely mounted on the shaft 18. The toe and heel posts are provided with means for supporting the shoe and last in the leveling operation comprising an adjustable toe support 22 carried by the toe post 16 and a spindle 24 carried by the heel post 20. The jack may also include a support 26 for the cone of the last, the construction and mounting of these parts being similar to that shown in Letters Patent of the United States No. 2,230,244 granted February 4, 1941 on an application filed in the name of F. V. Hart et al. to which reference may be made for a more complete description thereof. As will be understood by reference to that patent, the toe end of a shoe, after it has been placed on the jack, as shown in Fig. 1, is forced firmly against the toe support by the action of a lever 28 which is moved downwardly to tip the spindle 24, after which the lever 28 is locked to a toothed segment 30 carried by the heel post 20.

Upon rearward movement of the jack to carry the toe end of the shoe beneath the leveling roll 14, a roll 32 carried by a lever 34 engages a fixed guard member 36 causing the lever to pivot in a counterclockwise direction about a pin 38 carried by an arm 40 extending rearwardly from the shaft 18 and secured to the toe post 16 by a bolt 41. The upper end of the lever 34 is connected by a link 42 to mechanism by which the cone support 26 is forced upwardly into firm engagement with the cone of the last upon counterclockwise movement of the lever 34. The rear edge of the arm 40 carries segmental teeth 44 by which motion is imparted to the jack 12 to swing it about the shaft 18 in the leveling operation. The segmental teeth 44 are enclosed by the guard 36 which is rigidly supported on a bracket 37 (Figs. 3 and 5) attached to the frame 10.

The leveling roll 14 is mounted to turn on a rod 46 (Fig. 1) carried by a holder 48 which is pivotally connected at 50 to a carrier 52. The carrier is mounted for tipping movements laterally of the machine about the axis of a forwardly and rearwardly extending shaft 54 supported in bearings, one of which is indicated at 56, in the top of the machine. The holder 48 has a rearwardly extending arm 58 connected by a short link 60 to the rearwardly extending arm 62 of a bell crank lever 64 fulcrumed at 66 on the carrier 52. The bell crank lever has downwardly extending arms 68 carrying trunnions which extend into a circumferential groove 70 of a bushing 72 slidably mounted on the shaft 54, thus raising and lowering the roll 14.

To effect this up and down movement, and thereby to cause the roll to bear on the shoe sole, an upwardly extending arm 76, the upper portion of which carries trunnions which extend into a circumferential groove 78 in the bushing 72, is pivotally mounted on a laterally extending shaft 74 supported by suitable bearings in the frame of the machine. Mounted on the shaft 74 is a downwardly extending yoke 80 to which is connected by a threaded rod 82 a yoke-shaped member 84 in which is pivoted a lever 86 on a shaft 87. This lever has oppositely extending arms of equal lengths to the ends of which are pivoted blocks 88 providing abutments for compression springs 90, 92, the former bearing against an abutment 94 secured to the frame of the machine. The spring 92 at its upper end engages an abutment 96 pivotally connected to an arm 98 integral with the arm 76. The springs 90, 92 act to rock the arm 76 in a clockwise direction moving the slidable bushing 72 rearwardly along the shaft 54 and urging the leveling roll 14 downwardly to exert leveling pressure against the shoe bottom.

Provision is made for lifting the roll 14 against the action of the springs 90, 92 when the jack 12 is moved rearwardly to carry the toe end of the shoe under the leveling roll and whenever during the leveling operation it is desirable that the roll be lifted out of contact with the shoe bottom. Integral with the arm 76 is an arm 100 the forward end of which is connected by an adjustable link 102 to one end of a lever 104 pivoted between its ends on a pin 106 in a frame bracket 107, the other end of the lever carrying trunnions extending into a peripheral groove formed in the upper end of a plunger 108 which may be moved and controlled hydraulically. This plunger 108 projects upwardly from a piston movable vertically in a cylinder 110 as shown in detail in Patent 2,230,244, referred to above. When pressure fluid is introduced into the lower end of the cylinder 110 the lever 104 is rocked in a counterclockwise direction thereby lifting the leveling roll against the action of the springs 90, 92.

Figures 6, 7:
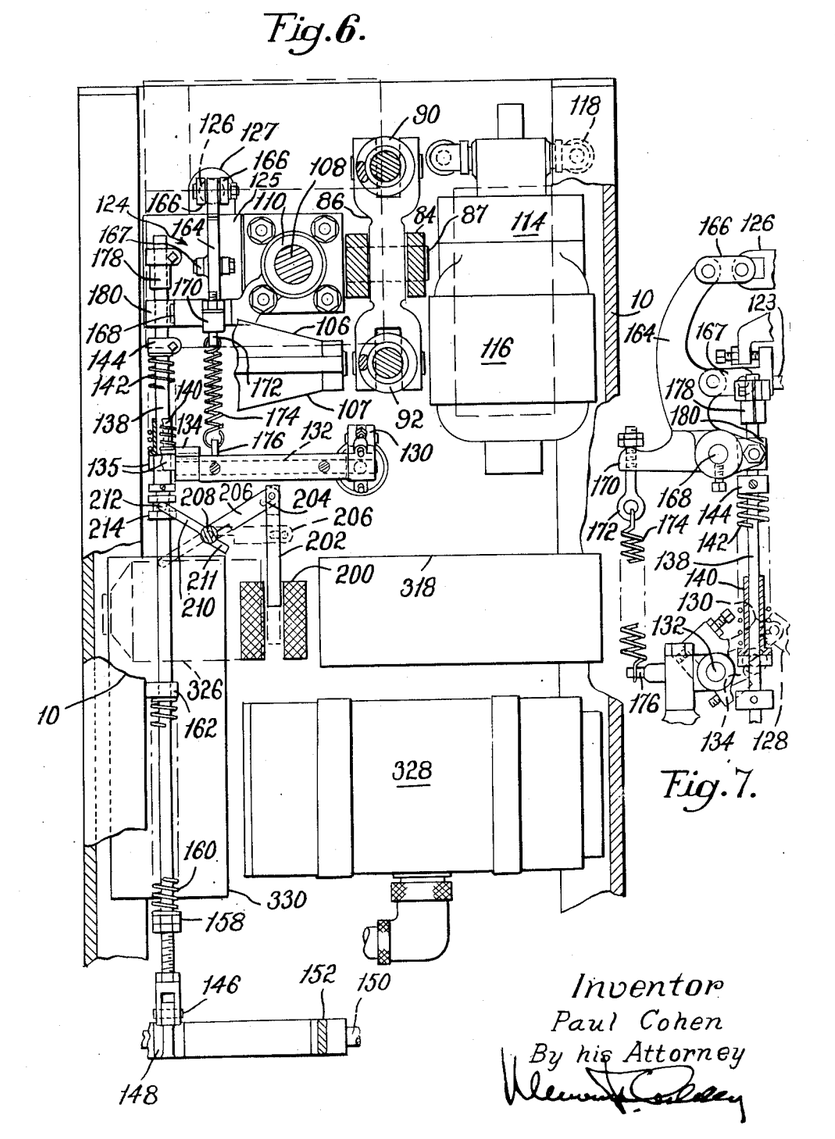
Fig. 6 is a plan view, partly in section on the line VI—VI of Fig. 1, taken through the lower portion of the machine just below a lower cross-shelf.
Fig. 7 is a side elevation of a valve-control rod and parts associated therewith.

Hydraulic mechanism, carried in the base of the machine, includes a reservoir 112 for pressure fluid to be supplied to the cylinder 110. Secured to the top of the reservoir 112 is a compressor 114 arranged to be driven by an electric motor 116, the discharge side of the compressor being connected by a pipe 118 to the lower end of a pressure-regulating valve 120. This valve includes a plunger 122 arranged, when the plunger is in an upper position, to permit free flow of pressure fluid from the reservoir 112 through the compressor and back to the reservoir by way of the valve 120. However, when the plunger 122 is moved downwardly fluid is then forced under high pressure from the compressor 114 into the cylinder 110 by way of a valve 124 (Fig. 6) having a stem 123 (Fig. 7) and contained within a casing 125 just back of the cylinder 110 in Fig. 1 and connected to it. This valve includes a plunger which, when depressed, interrupts the flow of pressure fluid into the cylinder 110 and permits exhaust therefrom whereby the roll 14 is pressed downwardly against the shoe bottom by the springs 90, 92. The valves 120, 124 may be constructed as shown in the Hart et al. patent.

Mechanism for depressing the plunger 122

(Fig. 1) of the valve 120 at the beginning of the leveling operation to cause lifting of the leveling roll as the toe end of the shoe is moved thereunder will now be described. To the upper end of the plunger 122 is connected a link 128 the upper end of which is pivoted to the lower end of a depending arm 130 carried at the near end (Fig. 1) of a rockshaft 132 (Figs. 3 and 5) journaled in the frame of the machine. The link 128 and the arm 130 form a toggle which is straightened upon clockwise movement of the arm 130 (Fig. 1) thereby to move the plunger 122 downwardly, operating the pressure regulating valve to supply pressure fluid to the cylinder 110 to lift the roll as described in the aforementioned patent.

Mechanism to operate the valve 120 includes a downwardly extending arm 134 which is secured to the far end of the rockshaft 132. The lower end of this arm is secured to a block 135 recessed to straddle a bushing 136 which is fast on a valve-control rod 138 (Fig. 7) mounted for sliding movement forwardly (toward the bottom of the sheet in Figs. 6 and 7) and rearwardly of the machine. Also slidable on the rod 138 is a bushing 140 urged forwardly along the rod by a spring 142, the rearward end of which engages a collar 144 secured to the rod. The arrangement is such that upon forward movement of the rod 138 the spring 142 acts on the bushing 140 and the block at the lower end of the arm 134 to swing the toggle links 128, 130 (Fig. 1) into substantially alined relation. As the toggle links are thus swung the plunger 122 is moved downwardly operating the pressure regulating valve 120 to supply pressure fluid to the cylinder 110.

This must take place when the jack is swung to carry a shoe toe under the roll 14. Accordingly the forward end of the rod 138 is pivoted at 146 (Fig. 1) to an arm 148 secured to a rockshaft 150 carried by the frame of the machine. Also secured to the rockshaft 150 is an upwardly extending curved arm 152 carrying at its upper end a roll 154 engageable with a downwardly extending arm 156 carried by the shoe support 12 and tiltable with it. The rod 138 carries a lock-nut 158 forming an abutment for one end of a coil spring 160 surrounding said rod, the other end of the spring acting against a fixed stop 162 on the machine frame. The spring 160 urges the rod 138 forwardly, holding the roll 154 in engagement with the arm 156 carried by the shoe support. Upon rearward movement of the shoe support to carry the shoe into operative relation to the leveling roll the arm 156 moves forwardly whereupon the spring 160 causes forward movement of the rod 138 to straighten the toggle 128, 130. Pressure fluid is accordingly supplied to the cylinder 110 to elevate the leveling roll against the action of the springs 90, 92 permitting movement of the toe end of the shoe under the roll without stubbing the end of the shoe.

At a predetermined point in the forward movement of the rod 138 during rearward movement of the shoe support the valve 124 is operated to cut off the flow of fluid into the cylinder 110 and to exhaust the fluid therefrom, whereupon the leveling roll is forced by spring pressure into engagement with the shoe bottom. This operation of the valve 124 is effected by a lever 164 (Fig. 7) connected by links 167 to the stem 123 of the valve 124. At its end the lever 164 is connected by links 166 to the plunger of a valve 127 which is arranged to act as a fluid check to prevent too sudden a release of the leveling roll 14 to the action of the springs 90 and 92 such as might tend to cause the roll to impart a hammer blow to the bottom of the shoe.

The lever 164 is pivotally carried by a pin 168 and has an upwardly extending arm 170 carrying an eye bolt 172 to which is connected one end of a spring 174, the other end being connected to a pin 176 carried by the frame of the machine. The rod 138 carries an abutment 178 which acts on a downwardly extending arm 180 of the lever 164 to move the lever against the action of the spring 174 at a predetermined point in the forward movement of the rod. The abutment 178 is adjustably positioned lengthwise of the rod so that it will move the lever 164 at the time when the toe end of the shoe moves under the roll 14 to permit movement of the roll by spring pressure against the shoe bottom.

At any time during the leveling operation the operator may, by stepping on a treadle 182 (Fig. 1), impart rearward movement to the rod 138 sufficient to operate the valve 124 and cause lifting of the roll 14. This treadle is pivoted at 184 to the base of the machine and is normally held in the up position shown in Fig. 1 by a spring 186, the upper position of the treadle being determined by a stop screw 188. Pivoted to the treadle 182 is a bar 190 having a slot 192 in its upper end arranged to receive a pin 194 carried by an arm 196 secured to the shaft 150. By depressing the treadle 182 the shaft 150 is rotated in a clockwise direction causing rearward movement of the rod 138 to operate the valve 124, thereby admitting pressure fluid to the cylinder 110 to lift the leveling roll.

Provision is also made for causing automatic lifting of the leveling roll if desired at predetermined times in the cycle of operation of the machine. For this purpose mechanism is provided which lies below a lower horizontal shelf 198 (Fig. 3) bolted to the sides of the frame 10. Secured to the underside of this shelf 198 (Fig. 1) is a solenoid 200 having an armature 202 the outer end of which is connected by a pin and slot connection 204 (Fig. 6) to an arm 206 journaled on a vertical pin 208 also secured to the underside of the shelf. Also journaled on the pin 208 is a lever 210 one end of which has a pin 212 extending downwardly between the flanges of a grooved collar 214 secured to the rod 138. The lever 210 also has a portion 211 extending from the opposite side of the pin 208 in position to be engaged by the arm 206 when the rod 138 is in its forward position and the arm 206 is moved by energization of the solenoid 200. With the machine at rest the arm 206 and the lever 210 assume the full line positions illustrated in Fig. 6. During the leveling operation the rod 138 is moved into its forward position, as heretofore described, whereupon the lever 210 assumes the broken line position shown in Fig. 6. If now at any time during the leveling operation the solenoid is energized the arm 206 moves into the broken line position shown, causing the lever 210 to move with it whereupon the rod 138 is moved rearwardly a sufficient amount to open the valve 124 and admit pressure fluid into the cylinder 110. As soon as the solenoid 200 is deenergized the rod 138 is moved forwardly by the spring 160 causing the lever 210 again to assume the broken line position of Fig. 6 and the arm 206 to be moved back to the full line position shown. Thus it will be seen that each time in the cycle of operations that the solenoid 200 is energized the leveling roll 14 will be lifted out of engagement with the shoe bottom. In addition, the operator may at any time by depressing the treadle 182 move the rod 138 rearwardly to cause lifting of the leveling roll.

Figure 3:
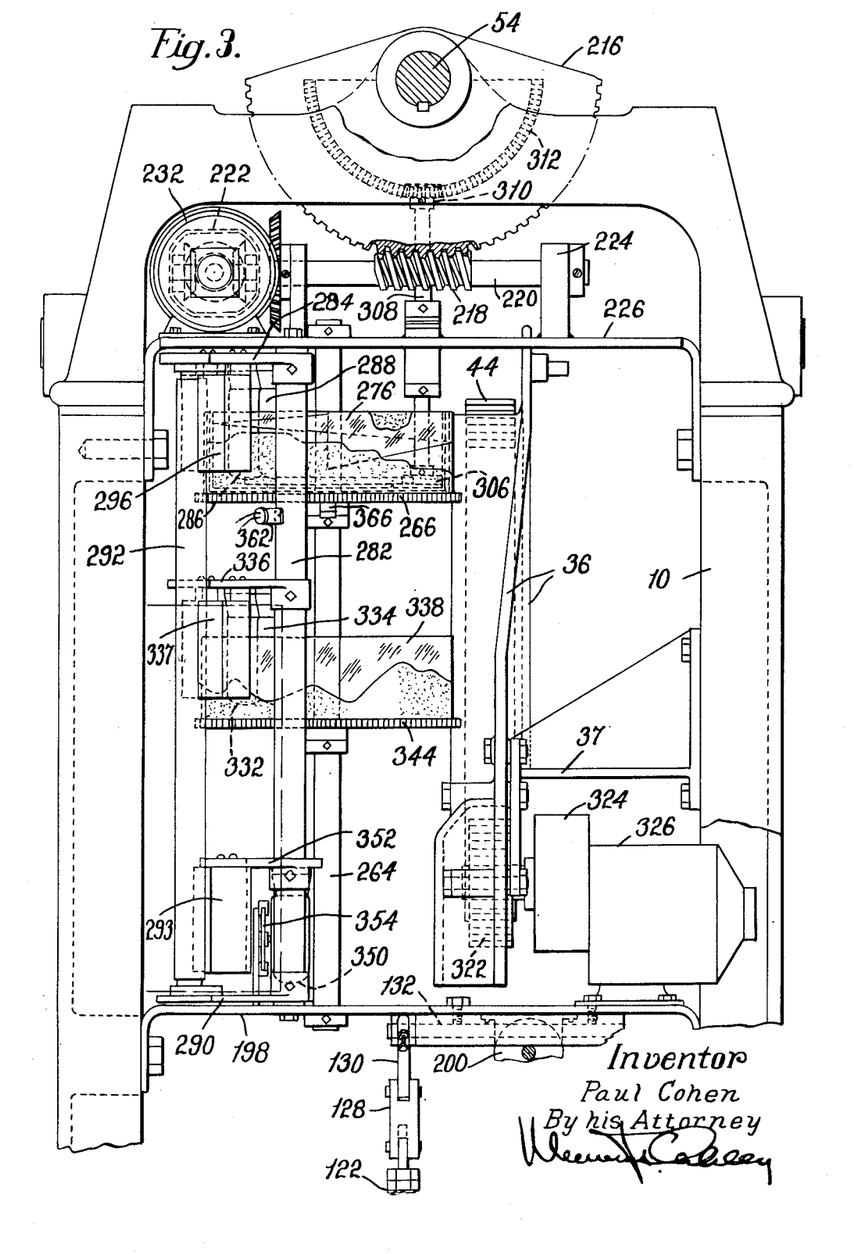
Fig. 3 is a rear elevation of the machine, with the roll lifting and depressing mechanisms omitted, to show the automatic control mechanism.

For imparting tipping movements to the leveling roll 14 during the leveling operation, the shaft 54 has keyed to it a gear segment 216 (Fig. 3). Meshing with the gear segment is a worm 218 carried by a shaft 220 which forms the output shaft of a conventional differential gear mechanism 222, the bearing for the outer end of the shaft being carried by a bracket 224 supported by an upper shelf 226 secured across the frame of the machine. Power is supplied to the differential gear mechanism 222, by a shaft 228 (Fig. 4) arranged to be driven at constant speed during the cycle of operations of the machine, and by a shaft 230 driven at variable speeds as will be explained. The direction and speed of the output shaft 220 of the differential gear mechanism will depend upon the relation of the speed of the shaft 230 to that of the shaft 228.

The shaft 230 is coupled to a variable speed motor 232 secured to the shelf 226. This upper shelf also carries a constant speed motor 234 arranged to be connected to the shaft 228 during the leveling cycle by a clutch 235 consisting of clutch elements 236, 238. Together, these motors 232 and 234 constitute a power means supplying power through the shaft 220 to tilt the leveling roll 14. The clutch element 238 is splined into a shaft 240 coupled to the shaft 228, and adjacent to the clutch element is a flanged collar 242 arranged to receive a fork 244 of a shifting lever 246 pivoted at 248 to a bracket 250 carried by the shelf 226. When the shifting lever 246 is moved in a counterclockwise direction against the action of a spring 252, the clutch element 238 is moved into engagement with the clutch element 236 whereupon rotation is imparted to the shaft 228.

For thus swinging the shifting lever 246, a solenoid 254 is secured to the underside of the shelf 226, the armature of the solenoid being losely pivoted at 256 to the lower end of the lever 246. The circuit to this solenoid includes a normally open switch 258 at the lower left in Fig. 1 arranged to be contacted and closed by the lower surface of an arm 260 connected to the toe post 16 of the shoe support 12, whenever the shoe support is moved rearwardly to carry the shoe toward the leveling roll. The switch 258 is carried by an arm 261 pivoted on the shaft 150 and pivotally connected to the upper end of the bar 190 actuated by the treadle. The arm 260 maintains the switch 258 closed during the leveling operation so that the shaft 228 (Fig. 4) rotates continually at constant speed unless the treadle 182 is depressed to lower the arm 261 carrying the switch 258, moving it out of contact with the arm 260.

The speed of the motor 232 is controlled by a light-responsive mechanism in such a manner that tipping movements are imparted to the leveling roll 14 in accordance with a predetermined schedule. Carried between the shelves 198 and 226 is a vertical stationary shaft 264 (Fig. 4) and near the upper end of this shaft is journaled a large gear 266 which is driven at constant speed by a pinion 268 carried by a vertical shaft 270 extending parallel to the shaft 264. The upper end of the shaft 270 carries a worm gear 272 (Fig. 5) which meshes with a worm 274 carried by the shaft 240 driven by the constant speed motor 234.

Figures 12, 13:
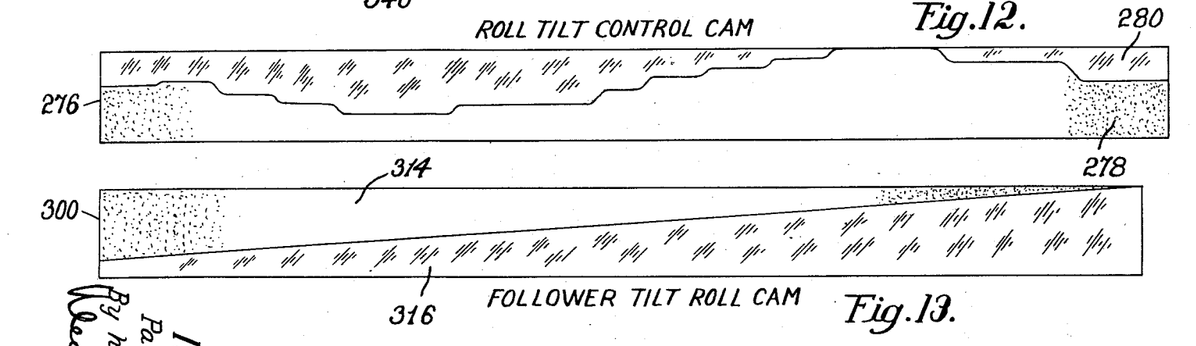
Fig. 12 is a similar view of the constant speed light cam for controlling the tilting movements of the leveling roll.
Fig. 13 is a similar view of the follower light cam which moves in synchronism with the tilting movements of the leveling roll.

Carried by the gear 266 turning on the shaft 264 is a master light cam 276 having an opaque lower portion 278, shown developed, in Fig. 12, and a transparent upper portion 280, the opaque portion extending upward from a zero or base line and being shaped to constitute a movable pattern member which will intercept varying amounts of light between a light source and a photocell by which the motor 232 is controlled. This cam may be formed of any suitable material such as photographic film or any other transparent substance upon which a suitably shaped opaque pattern has been applied. The opaque pattern 278 in Fig. 12 is of an appropriate shape to control the leveling roll through a cycle of operations.

Figure 4:
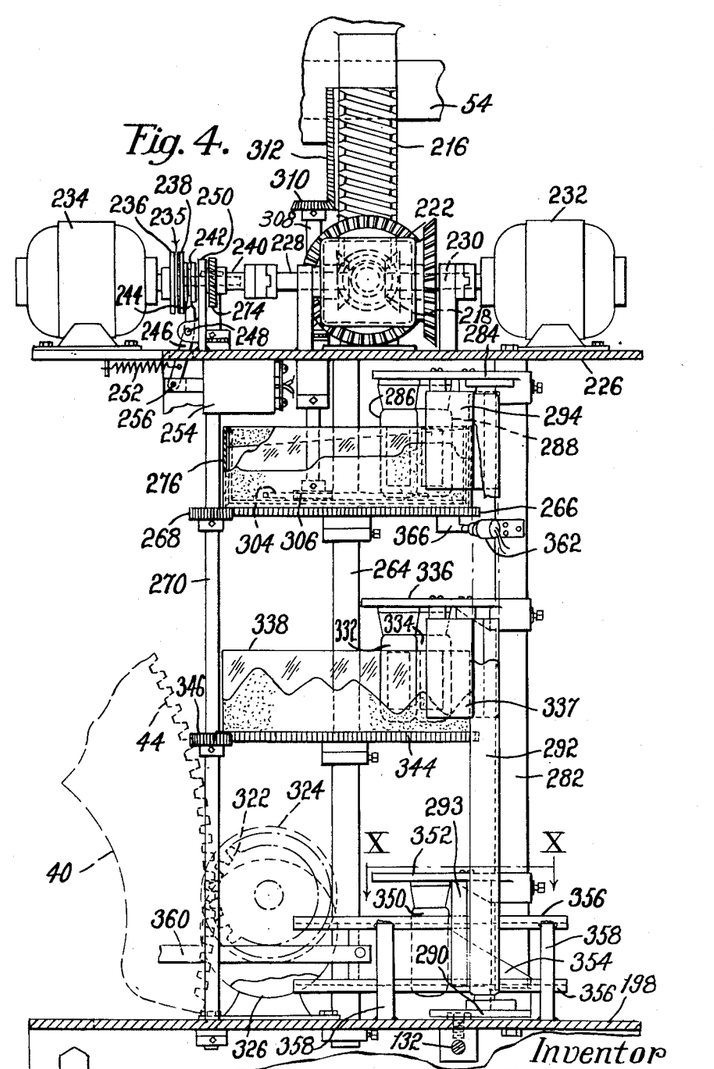
Fig. 4 is a side elevation of the control mechanism shown in Fig. 3.
Figure 8:
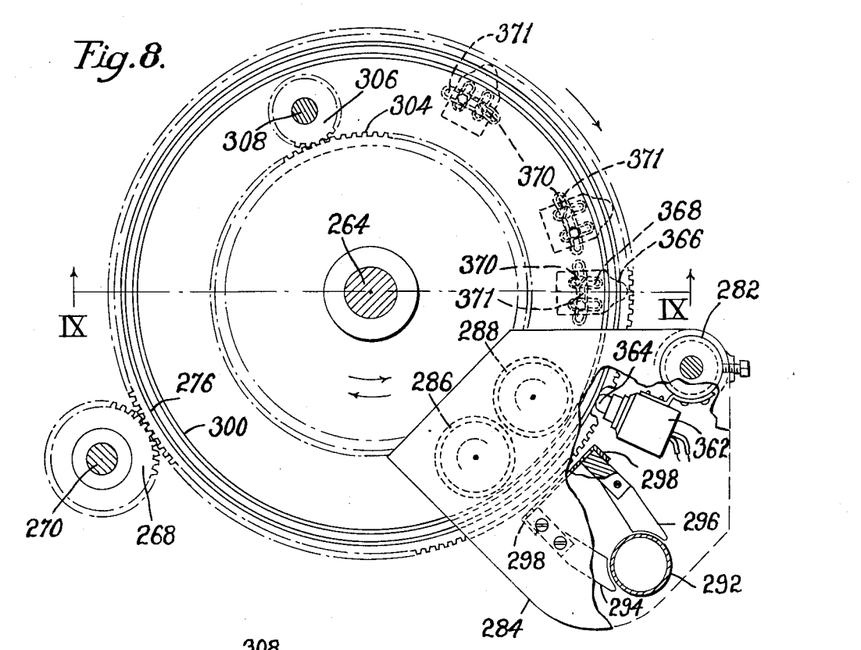
Fig. 8 is a plan view of the uppermost light cams, by which tilting movements of the leveling roll are controlled.

Carried between the shelves 198 and 226 is a vertical rod 282 (Fig. 4) to the upper end of which is secured a bracket 284 supporting a pair of depending light-sensitive devices such as the photoelectric cells 286, 288. Carried between this bracket and a bracket 290 at the lower end of the rod 282 is a tubular fluorescent light 292 between which and the photoelectric tubes 286, 288 is the master light cam 276. Light from the upper end of the fluorescent tube 292 is directed toward each of the photoelectric tubes 286, 288 in any suitable manner as by "Lucite" members 294, 296 (Figs. 4 and 8). The ends of these members which are remote from the light 292 carry opaque plates 298 having slits for the passage of light to the tubes 286, 288.

Figures 9, 10:
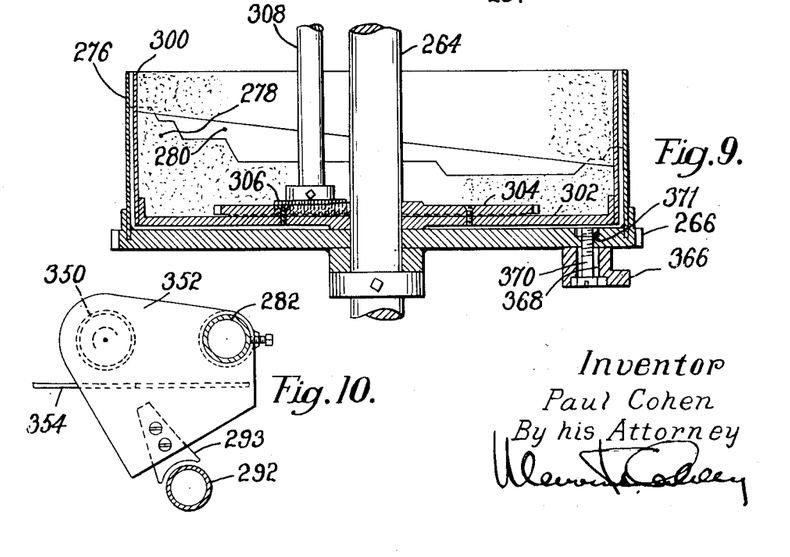
Fig. 9 is a vertical section on the line IX—IX of Fig. 8.
Fig. 10 is a detail in section on the line X—X of Fig. 4.

The amount of light reaching the tubes 286, 288 is controlled not only by the position of the master cam 276 which is turned at constant speed during the leveling operation, but also by the position of a follow up or follower light cam 300 which is mounted within the cam 276. The cam 300 is carried by a plate 302 (Fig. 9) journaled on the shaft 264 immediately above the gear 266, there being secured to the upper face of the plate 302 a gear 304. Engageable with this gear is a pinion 306 secured to the lower end of a shaft 308 journaled in the shelf 226 and extending thereabove as indicated in Fig. 4, the upper end of the shaft carrying a bevel gear 310 meshing with a semicircular bevel gear 312 fast on the roll carrying shaft 54. By this arrangement the follower cam 300 will move in accordance with the actual tipping movements of the leveling roll so that its position at any time will depend upon the position into which the leveling roll has moved. The follower cam 300, as shown in Fig. 13, is provided with an upper opaque portion 314 extending downward from a zero or base line at its top edge and which increases in depth from right to left as viewed in that figure and a complementally shaped lower transparent portion 316. Thus it will be seen that the amount of light which passes from the fluorescent tube 292 to the photoelectric tubes 286, 288 will depend not only upon the position of the master cam 276 but also upon the position of the follower cam 300, the light passing between the lower opaque portion of the cam 276 and the upper opaque portion of the cam 300. The purpose of the follower cam 300 is to provide a correction in the event that the leveling roll is not in the precise position it should be at any time during the leveling operation. The cycle of operation of the roll depends upon the opaque pattern formed on the cam 276 which is turned at a constant speed during the leveling operation but the actual amount of light which reaches the photoelectric tubes depends not only upon the position of this cam but also upon the position of the leveling roll as reflected by the position of the follower cam 300. Thus this latter cam at all times acts to impose a correction factor upon the master cam 276 if the leveling roll is not properly positioned.

Figure 14:
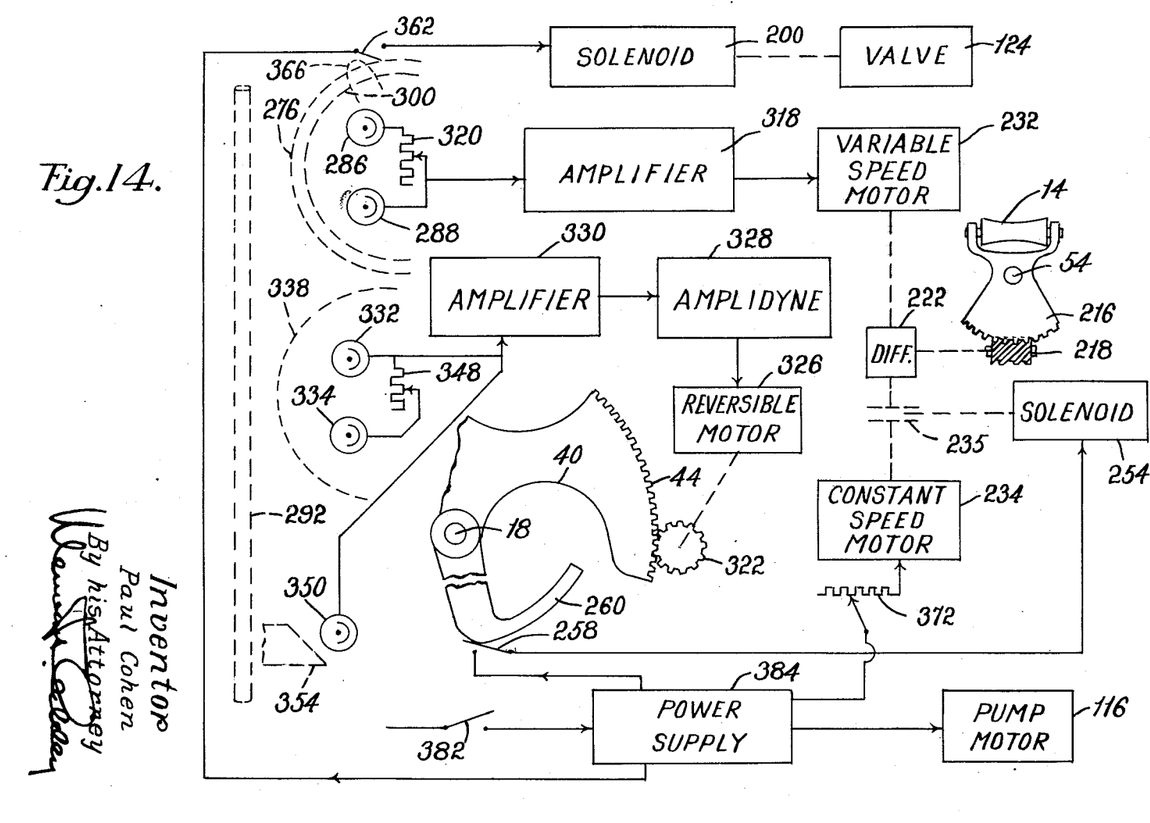
Fig. 14 is a schematic wiring diagram.

The photoelectric tube 286 is the main controlling tube for the variable speed motor 232 and its signal, passing through a suitable amplifier 318 as indicated in the schematic wiring diagram of Fig. 14, provides a photoelectrical control for the power means for tilting the leveling roll. The photoelectric tube 288 modifies the action of the tube 286 and is designed to anticipate the position into which the leveling roll is to be moved so that the roll will start moving before the light cams indicate that a certain movement should have taken place. In this manner the tube 288, by anticipating the motion that is to take place, acts to minimize hunting of the leveling roll. A rheostat 320 is connected between the photoelectric tube 288 and the amplifier 318 and permits control of the effectiveness of this photoelectric tube, as its signal is added to that from the tube 286, in anticipating the roll movement to be called for by the photoelectric tube 286 and hence the predominance of one tube over the other.

Figure 11:
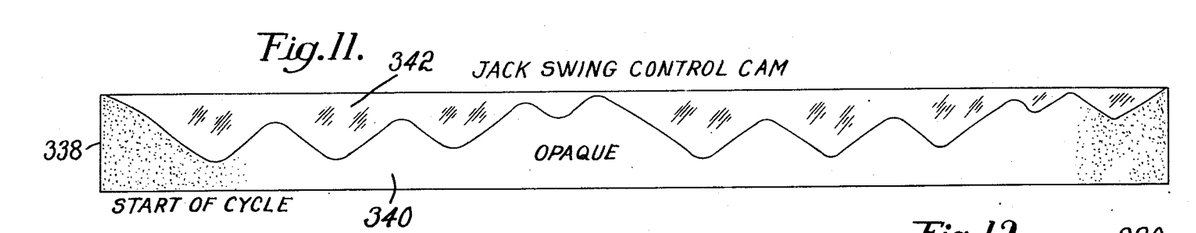
Fig. 11 is a developed view of a constant speed light cam for controlling the swinging movements of the jack.

For moving the jack 12 toward and beneath the roll 14 in the leveling operation, a pinion 322 (Figs. 1 and 4) meshes with the gear segment 44, this pinion being driven through reduction gearing 324 (Fig. 3) by other power means such as a reversible motor 326 supported on the lower shelf 198. Electric current for operating the motor 326 is derived from an "Amplidyne" generator 328, the output of which varies greatly in response to minute changes in the field excitation. The current input to the "Amplidyne" generator passes through an amplifier 330 (Fig. 14) and is controlled by a pair of photoelectric tubes 332, 334 (Fig. 4). These photoelectric tubes are carried by a bracket 336 which is secured to the rod 282 and is notched to make room for the fluorescent light 292. The photoelectric tubes on this bracket also respond to the light from the fluorescent light 292 guided by "Lucite" members, one of which is shown at 337 (Fig. 4), which are similar to the members 294, 296 (Fig. 8). The amount of light passing to the photoelectric tubes 332, 334 is controlled by a light cam 338 having a lower opaque portion 340 (Fig. 11) and an upper transparent portion 342. This light cam is carried by a gear 344 (Fig. 4) journaled on the shaft 264 and driven by a pinion 346 carried by the shaft 270 which is in turn driven by the constant speed motor 234 as heretofore described. The photoelectric tube 332 is the main controlling tube and the tube 334 corresponds to the aforementioned tube 288 in anticipating the movement to be imparted to the jack, their signals being combined to control the reversible motor 326. A rheostat 348 (Fig. 14) is provided for varying the effectiveness of the tube 334.

To insure that the jack moves in accordance with a predetermined cycle, an additional photoelectric tube 350 is connected to the amplifier 330 and is carried by a bracket 352 secured to the lower end of the rod 282. Interposed between the tube 350 and the fluorescent tube 292 with its "Lucite" guide prism 293 (Fig. 10) is a follower cam 354 (Fig. 4) arranged for sliding movement in tracks 356 carried by brackets 358 supported by the shelf 198. The right end of this light-controlling follower cam 354 is cut at an angle so that the farther the cam moves to the left, as viewed in Fig. 4, the greater the amount of light which reaches the photoelectric tube 350. This light-controlling cam is connected by a link 360 to the jack 12 (Fig. 1) below the supporting shaft 18 so that movements of the jack to carry a shoe forwardly and rearwardly beneath the leveling roll will be imparted to the cam 354 so that the cam will move to the left upon movement of a shoe carried by the jack rearwardly beneath the leveling roll. The cam 354 in its function corresponds to the cam 300 associated with the cam 276, the total amount of light reaching the photoelectric tubes 332 and 350 controlling the current input to the "Amplidyne" generator and consequently the direction and speed of the motor 326. If, for any reason, the jack is not in the proper position at any time during the cycle of operations a correction is introduced by the control of light reaching the photoelectric tube 350 which is controlled directly in accordance with the particular position of the jack at that time.

It may be desirable during certain portions of the cycle of operations automatically to lift the leveling roll out of contact with the shoe bottom. As heretofore explained, this lifting of the leveling roll may be accomplished at any time upon energization of the solenoid 200. For thus energizing this solenoid automatically as desired, a switch 362 (Figs. 4 and 8) is secured to the rod 282 at a level below that of the gear 266. This switch is normally open and has an actuating button 364 directed toward the gear 266. Secured to the underside of this gear are one or more switch-actuating members 366 (Fig. 9) provided with radial slots 368 through which pass bolts 370 by which they are secured to the gear 266 for adjustment radially thereof. The bolts 370 pass through a circumferentially extending slot 371 in the gear 266, thereby providing for adjustment of the switch-actuating member 366 circumferentially of the gear to vary the time during the rotation of the gear at which the switch-actuating member moves into contact with the button 364 of the switch 362. By moving the member 366 far enough inwardly of the gear it will pass by the switch without actuating the button so that it does not cause lifting of the leveling roll.

Figure 2:
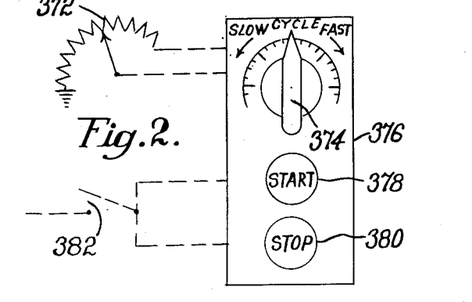
Fig. 2 is a front elevation of the manual control box.
Figure 5:
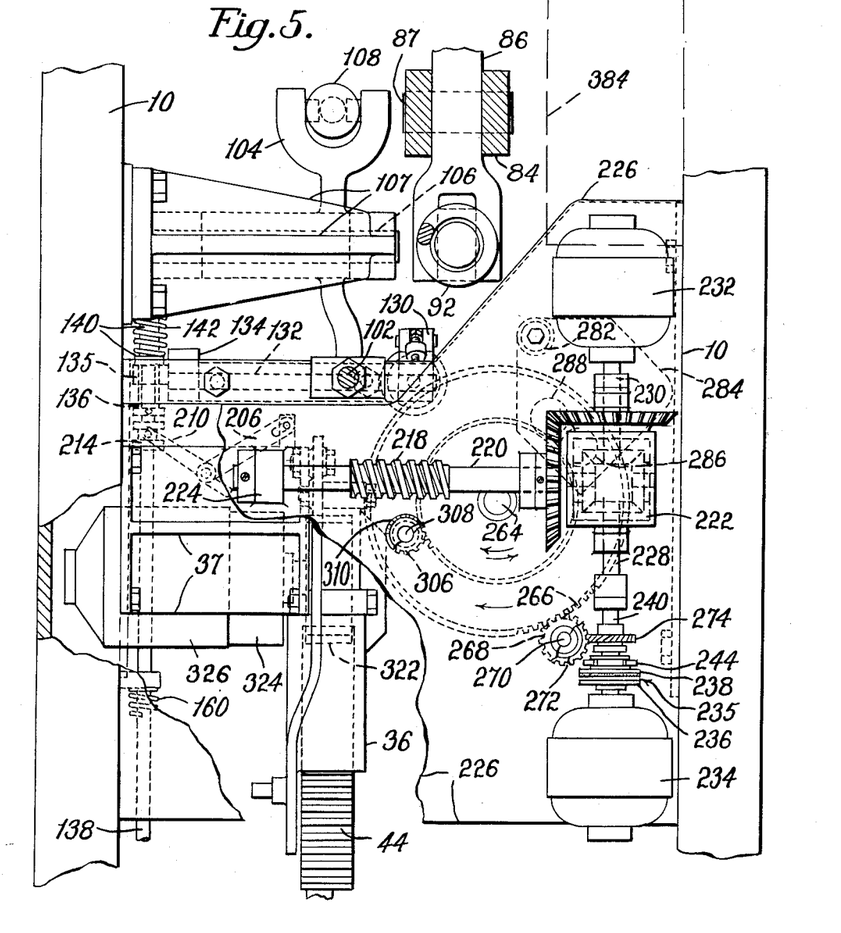
Fig. 5 is a plan view, partly in section, taken through the upper portion of the machine looking down on the roll-tilting mechanism supported on an upper cross-shelf.

For controlling the speed of the cycle of operation a rheostat 372 is interposed in the circuit to the constant speed motor 234, as shown in Fig. 14. This rheostat may be controlled by a knob 374 (Fig. 2) carried by a control box 376. In operating upon large sized shoes, it may be desirable to operate the machine somewhat more slowly than in operating upon small sized shoes and this is readily regulated by manipulation of the knob 374. Also carried by the control box 376 are start-and-stop buttons 378, 380 for operating a main power switch 382 (Fig. 14) positioned between commercial supply mains (not shown) and the power supply 384 (Figs. 5 and 14).

In the operation of the machine the button 378 will be depressed at the beginning of the day, thereby to supply power to the fluorescent light 292, the amplifiers 318, 330, the pump motor 116 and the constant speed motor 234. With the jack 12 in its forwardmost position, as shown in Fig. 1, which position it assumes with the machine at rest, the switch 258 below the jack is open so that the solenoid 254 (Fig. 4) is deenergized and the clutch 236, 238 disengaged. Consequently no motion is imparted to the shaft 270 by which the light cams 276 and 338 are rotated. A shoe is placed on the jack as heretofore explained, and the jack is then moved rearwardly by the operator until the arm 260 closes the switch 258 thus energizing the solenoid 254 and engaging the clutch between the constant speed motor 234 and the shaft 228. The cams 276 and 338 now start to rotate so that motion is imparted by the motor 326 to carry the jack in and out in accordance with the amount of light reaching the photoelectric tubes 332 and 334.

Tilting movements are imparted to the leveling roll in accordance with the amount of light reaching the photoelectric tubes 286, 288. The particular cycle of operations of both the leveling roll and the shoe-supporting jack are determined by the opaque patterns formed on the cams 276 and 338, and it will be understood that by replacing these light cams with light cams having differently shaped opaque patterns thereon the cycle of operations of either the leveling roll, the shoe-supporting jack or both may be readily varied. The follower cams 300 and 354 assume positions corresponding to the positions of the leveling roll and the jack at all times during the cycle of operations and interpose a correction in the movements of these members in the event that they are not properly positioned in accordance with the patterns on the cams 276, 338 at any portion of the cycle of operations. If desired, the leveling roll may be lifted at predetermined times in the cycle of operations by proper adjustment of the members 366 (Fig. 8) by which the switch 362 is automatically closed to energize the solenoid 200. It will be understood that by depressing the treadle 182 the valve 124 is operated to lift the leveling roll.

From the above it will be understood that by the use of transparent light control members the cycle of operations of the machine is controlled automatically, there being provision for insuring that the parts move in accordance with a predetermined cycle.

Having thus described my invention, what I claim as new and desire to secure by Letters Patent of the United States is:

1. In an automatic apparatus, a movable mechanism, power means for moving the mechanism, and means to control said power means, said control means comprising two photocells positioned adjacent to one another, a source of light for said cells, and a light-intercepting device movable between the source of light and the cells to pass variable amounts of light to the cells successively, said cells being both connected to combine their signals, whereby one cell provides a signal anticipating movements to be effected by the other cell.

2. In an automatic apparatus, a movable mechanism, power means for moving the mechanism, means to control said power means, said control means comprising two photocells positioned adjacent to one another and arranged to combine their signals, a source of light for said cells, a light-intercepting device movable between the source of light and the cells to pass variable amounts of light to the cells successively, and means for determining the predominance of one signal over the other.

3. Apparatus for controlling a movable mechanism to reproduce a predetermined cycle of movement, said apparatus comprising a light sensitive device, a source of light, superposed cooperating light intercepting members positioned between the source of light and the light sensitive device to produce a composite signal dependent on the amount of light transmitted, one of said intercepting elements having a controlling contour representative of the cycle of movement which is desired, means for moving that element, the other element being connected to the movable mechanism and having an effective contour representative of the position of that mechanism, and means for transmitting the composite signals produced in the light sensitive means by said cooperating intercepting means to a power device by which the mechanism may be moved through the desired cycle.

4. In combination, a movable mechanism, power means to move the mechanism, and apparatus for automatically controlling the movable mechanism to operate it in a predetermined cycle, said apparatus comprising a photocell, a source of light, concentric partly opaque cylinders interposed between the source of light and the photocell, means for rotating one of said cylinders at a predetermined speed, and means for positioning the other cylinder in proportion to the position of the mechanism under control, the opaque portions of said cylinders being thus variably spaced to allow the passage of variable amounts of light to produce in the photocell the desired signals, and means to transmit the signals to the power means.

5. In combination, a movable mechanism, a photocell control apparatus for determining the movement of said mechanism, said apparatus including a photocell, a source of light, coacting adjacently positioned control cams movable between the light and the cell, said cams each having an opaque portion extending oppositely from its zero line in a direction to overlap that on the other cam, said zero lines being spaced, and means for variably moving said cams to control the operation of the mechanism, and means interposed between the control apparatus and the mechanism for utilizing the signal produced in the photocell by the amount of light passing through the space between said cams to produce the desired movement of the mechanism.

6. In combination, a movable mechanism, a photoelectric control apparatus for determining the movement of said mechanism, said apparatus including a photocell, a source of light, superposed control cams movable between the light and the cell, said cams each having an opaque portion, that on one cam extending from a base line upward and that on the other cam extending from a top line downward, one cam being a master cam and the other a follower cam, means for moving the latter cam in proportion to movement of the mechanism, and means for moving the master cam at a predetermined speed, and means interposed between the control apparatus and the mechanism for utilizing the signal produced in the photocell by the light passing through the space between said cams to produce in the mechanism the desired movement.

7. In combination, a shoe leveling machine including a leveling tool, means for tilting said tool from side to side, and means for controlling the tilting of the tool comprising a differential connected thereto, a constant speed motor connected to one side of said differential, a variable speed motor connected to the other side of said differential, a photocell for controlling said variable speed motor, a source of light, a light-intercepting cam movable between said light and said cell in response to the actual tilting movements of the tool, a coacting light-intercepting cam, and means for moving said latter cam in a predetermined cycle.

8. In combination, a shoe leveling machine including a leveling tool and means for producing a relative movement between the tool and a shoe supported in the machine, lengthwise of the shoe, said means comprising a reversible motor, a photocell for controlling said reversible motor, a source of light, a light-intercepting cam interposed between the source of light and the cell, means for moving the cam in a predetermined cycle, another photocell the signal of which is superposed upon the signal produced by the first cell, and means for controlling the latter cell by a light-intercepting cam movable back and forth in proportion to the relative movement between the shoe and the tool.

9. In combination, a shoe leveling machine having a swinging, shoe-supporting jack, a leveling roll, electrical power means for tilting said leveling roll, electric power means for reversibly moving said jack back and forth, photocell controls for both said power means, and a switch operated by the swinging jack for rendering one of said power means effective.

10. The combination of a shoe leveling machine having a power-operated swinging jack, a leveling tool, a carrier for it, means for tilting said carrier, and means for moving the tool on the carrier toward and away from the shoe, with photocell control means to determine the tilting movements of the tool carrier in accordance with a predetermined cycle and including a traveling light-intercepting cam, and with means operated in synchronism with said cam for raising said tool away from the shoe bottom at a predetermined time in said cycle.

PAUL COHEN.

REFERENCES CITED

The following references are of record in the file of this patent:

UNITED STATES PATENTS

| Number | Name | Date |
|---|---|---|
| 1,985,044 | Lyle | Dec. 18, 1934 |
| 2,158,536 | Fisher et al. | May 16, 1939 |
| 2,298,407 | Miller | Oct. 13, 1942 |
| 2,322,334 | Winkley | June 22, 1943 |
| 2,346,240 | Thomas | Apr. 11, 1944 |
| 2,438,825 | Roth | Mar. 30, 1948 |
| 2,459,253 | Tyrner | Jan. 18, 1949 |
| 2,463,534 | Hawkins | Mar. 8, 1949 |